(12) United States Patent
Larsson et al.

(10) Patent No.: US 12,007,025 B2
(45) Date of Patent: Jun. 11, 2024

(54) ASSEMBLY, HOUSING COVER HAVING AN ASSEMBLY OF THIS TYPE, AND FIELD DEVICE HAVING A HOUSING COVER OF THIS TYPE

(71) Applicant: Endress+Hauser Flowtec AG, Reinach (CH)

(72) Inventors: Björn Larsson, Birsfelden (CH); Philipp Rimkus, Lörrach (DE); Philipp Loeffel, Oberwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 112 days.

(21) Appl. No.: 17/757,645

(22) PCT Filed: Dec. 1, 2020

(86) PCT No.: PCT/EP2020/084099
§ 371 (c)(1),
(2) Date: Jun. 17, 2022

(87) PCT Pub. No.: WO2021/121966
PCT Pub. Date: Jun. 24, 2021

(65) Prior Publication Data
US 2023/0020846 A1    Jan. 19, 2023

(30) Foreign Application Priority Data

Dec. 20, 2019  (DE) .................... 10 2019 135 583.4

(51) Int. Cl.
*F16J 15/06* (2006.01)
(52) U.S. Cl.
CPC .......... *F16J 15/061* (2013.01); *F16J 15/062* (2013.01)

(58) Field of Classification Search
CPC ............................ F16J 15/062; F16J 15/061
See application file for complete search history.

(56) References Cited

U.S. PATENT DOCUMENTS

| 2,462,596 A | * | 2/1949 | Bent | ........................ F16J 15/32 |
| | | | | 277/910 |
| 3,785,142 A | * | 1/1974 | Soguel | ............... G04B 37/0008 |
| | | | | 277/910 |

(Continued)

FOREIGN PATENT DOCUMENTS

| DE | 10032926 A1 | 1/2002 |
| DE | 102009030494 A1 | 5/2011 |

(Continued)

*Primary Examiner* — Eugene G Byrd
(74) *Attorney, Agent, or Firm* — Mark A. Logan; Endress+Hauser (USA) Holding, Inc.

(57) ABSTRACT

An assembly comprises a circular panel; an annular body; and an elastomer ring. The annular body has a panel seat surrounded by a lateral surface having a ring shaped outer groove bounded in a first axial direction by a first outer shoulder and bounded in an opposing, second axial direction by a second outer shoulder. Adjoining the first outer shoulder is a guide surface having a radius monotonically increasing with separation from the first shoulder. The circular panel has an outer lateral surface having a peripheral inner groove extending radially inwards. The two inner shoulders have a convex contour in which the rotational axis of the circular panel extends. The elastomer ring is clamped between both inner shoulders and both outer shoulders, whereby a shifting of the circular panel out of the annular body is prevented up to a limit loading.

2 Claims, 1 Drawing Sheet

(56) References Cited

U.S. PATENT DOCUMENTS

| | | | | |
|---|---|---|---|---|
| 4,306,652 A * | 12/1981 | Inaba | ............ | F16J 15/32 |
| | | | | 73/431 |
| 5,117,743 A * | 6/1992 | Yuda | ............ | F01B 11/02 |
| | | | | 92/128 |
| 5,516,122 A * | 5/1996 | Caffee | ............ | F16L 23/20 |
| | | | | 285/918 |
| 6,361,049 B1 * | 3/2002 | Joco | ............ | F16J 15/062 |
| | | | | 277/910 |
| 10,337,275 B1 * | 7/2019 | Miller | ............ | E21B 33/04 |
| 2007/0175172 A1 * | 8/2007 | Sousa | ............ | F16J 15/062 |
| | | | | 52/741.1 |
| 2008/0029972 A1 * | 2/2008 | Smathers | ............ | F16J 15/062 |
| | | | | 277/641 |
| 2010/0084827 A1 * | 4/2010 | Peddle | ............ | F16J 15/061 |
| | | | | 277/644 |
| 2011/0232245 A1 * | 9/2011 | Protasiewicz | ............ | F16J 15/062 |
| | | | | 55/502 |
| 2011/0316239 A1 * | 12/2011 | Holliday | ............ | F16L 23/167 |
| | | | | 277/602 |
| 2017/0211703 A1 * | 7/2017 | Hatano | ............ | F16J 15/104 |
| 2017/0219139 A1 * | 8/2017 | Bredbeck | ............ | F16J 15/061 |
| 2018/0180183 A1 * | 6/2018 | Dean | ............ | F16J 15/025 |
| 2019/0011065 A1 * | 1/2019 | Atkinson | ............ | F16L 13/142 |
| 2019/0368610 A1 * | 12/2019 | Mochiduki | ............ | F16J 15/061 |

FOREIGN PATENT DOCUMENTS

| | | | | | |
|---|---|---|---|---|---|
| FR | 1125551 | A1 | 11/1956 | | |
| JP | 2017089681 | A * | 5/2017 | ............ | F04B 39/00 |
| JP | 2018040472 | A * | 3/2018 | ............ | F16J 15/024 |
| WO | 2010006838 | A1 | 1/2010 | | |

* cited by examiner

ASSEMBLY, HOUSING COVER HAVING AN ASSEMBLY OF THIS TYPE, AND FIELD DEVICE HAVING A HOUSING COVER OF THIS TYPE

CROSS-REFERENCE TO RELATED APPLICATIONS

The present application is related to and claims the priority benefit of DPMA Patent Application No. 10 2019 135 583.4, filed on Dec. 20, 2019, and International Patent Application No. PCT/EP2020/084099, filed Dec. 1, 2020, the entire contents of which are incorporated herein by reference.

TECHNICAL FIELD

The invention relates to an assembly, to a housing lid having such an assembly, and to a field device having such a housing lid.

BACKGROUND

Assemblies of the field of the invention, especially housing lids, comprise a circular panel and an annular body, which has a seat for the circular panel. The seat for the circular panel can, for example, have a stop, against which the circular panel is axially clamped, or the circular panel can be held in the seat by means of a metal retaining ring, wherein supplementally a sealing ring is provided, which lies against the circular panel, in order to avoid gas exchange past the circular panel between two volumes separated from one another by means of the circular panel.

An assembly of the field of the invention is used, among other possibilities, as a housing lid of a field device housing, in order to close such, wherein it is often required that the field device satisfy ignition protection type Ex-d, i.e. "pressure resistant encapsulation". Accordingly, the above described assemblies have comparatively complex designs with high strengths and strict production tolerances, in order to achieve the required protection class.

SUMMARY

It is an object of the invention to provide a simplified assembly, without degrading performance of the assembly.

The assembly of the invention comprises: a circular panel; an annular body; and an elastomer ring; wherein the annular body has a panel seat, which is surrounded by a lateral surface, wherein the lateral surface has a ring shaped, surrounding, outer groove, which is bounded in a first axial direction by a first outer shoulder, and which is bounded in an opposing, second axial direction by a second outer shoulder; wherein there adjoins the first outer shoulder in the first axial direction a guide surface, whose radius increases monotonically with separation from the first shoulder, wherein $dr/dz<\frac{2}{3}$ and, especially, $dr/dz<\frac{1}{3}$; wherein the circular panel has an outer lateral surface having a peripheral inner groove, which extends radially inwards, which is bounded in the first axial direction by a first inner shoulder, and which is bounded in the second axial direction by a second inner shoulder; wherein at least the two inner shoulders have a convex contour in an axial longitudinal section, in which the rotational axis of the circular panel extends, wherein the elastomer ring is clamped between both inner shoulders and both outer shoulders, whereby especially a shifting of the circular panel out of the annular body is prevented up to a limit loading.

The limit loading can in another development of the invention comprise, for example, a load, at which the elastomer ring breaks, or an impact of energy greater than 7 Joule, or a positive pressure of greater than 0.2 bar, for example, greater than 0.5 bar, especially greater than 1 bar.

Especially, the circular panel is held in the panel seat exclusively by the elastomer ring.

According to another development of the invention, the elastomer ring acts, additionally, as a sealing ring, wherein especially the second inner shoulder and the second outer shoulder serve as sealing surfaces.

The elastic suspension via the elastomer ring enables, additionally, the absorption of impact energy, whereby the panel experiences significantly smaller forces in the case of impacts.

A contour is convex when a straight connecting line between two points on the surface of the contour extends through the contour or on the surface of the contour.

In an additional development of the invention, the inner groove has an empty relief space, which is bounded by the elastomer ring and whose cross sectional area in the longitudinal section amounts to not less than a fourth, for example, not less than a third, of a cross sectional area of the elastomer ring in the relaxed, not clamped state.

In an additional development of the invention, the height h of the relief space is less than the cross section of the elastomer ring.

In an additional development of the invention, the height h of the relief space increases monotonically with the radius, wherein for the slope dh/dr of the height h as a function of the radius r between the first inner shoulder and the second inner shoulder, on at least the radially outer 50% of the areas of the inner shoulders, between which the elastomer ring is axially clamped: $dh/dr>\frac{1}{2}$, especially $dh/dr>\frac{2}{3}$.

In an additional development of the invention, the guide surface has a frustoconical shape.

In an additional development of the invention, the circular panel comprises a transparent material, especially glass or a transparent polymer, for example, PMMA, PEEK or polycarbonate.

In an additional development of the invention, the annular body comprises a metal material, for example, aluminum, or a polymer, for example, PEEK or polycarbonate.

In an additional development of the invention, the elastomer ring comprises an elastomer, for example, VMQ, HNBR, FKM, EPDM.

In an additional development of the invention, the maximum radial separation between the lateral surface of the circular panel and the lateral surface of the panel seat, especially over an axial length of not less than 10 mm, amounts to no more than 0.15 mm.

In an additional development of the invention, in an axial longitudinal section through the center of the circular panel, a first connecting line connects a first center of a first support surface of the elastomer ring on the first inner shoulder and a second center of a second support surface of the elastomer ring on the second outer shoulder with one another, wherein a second connecting line connects a third center of a third support surface of the elastomer ring on the second inner shoulder and a fourth center of a fourth support surface of the elastomer ring on the first outer shoulder with one another, wherein the first connecting line is inclined from the rotational axis of the circular panel by no more than 45°, especially by no more than 40°, wherein the second connecting line is inclined from the rotational axis of the circular panel by no more than 45°, especially by no more than 40°, wherein the first connecting line is inclined from the rotational axis of the circular panel by not less than 15°, especially by not less than 23°, wherein the second connecting line is inclined from the rotational axis of the circular panel by not less than 15°, especially by not less than 23°.

In an additional development of the invention, a minimum separation between the first inner shoulder and the second outer shoulder amounts to no more than 90% of the cross section of the elastomer ring, wherein a minimum separation between the second inner shoulder and the first outer shoulder amounts to no more than 90% of the cross section of the elastomer ring.

In an additional development of the invention, a minimum radius of the first outer shoulder is not more than 0.5 mm, especially not more than 0.2 mm, greater than a maximum radius of the second inner shoulder.

The housing lid of the invention for a field device comprises an assembly of the invention as claimed in one of the preceding claims, wherein the annular body has further a cylindrical wall section.

The cylindrical wall section can have a screw thread, especially an internal screw thread, in order to be able to secure the housing lid on a housing body. Other types of securement are likewise possible, for example, screws or a bayonet connection.

The field device of the invention includes a housing and an operating circuit, which is arranged in the housing, wherein the housing has a housing body and at least one housing lid of the invention, wherein the screw thread of the housing lid is screwed onto a complementary screw thread of the housing body, in order to enclose the operating circuit.

In an additional development of the invention, the field device satisfies ignition protection type, "pressure resistant encapsulation", Ex-d.

A field device, within the scope of the invention, includes, for example, a measurement transmitter, such as used, for example, in industrial process measurements technology, in order to register process parameters, such as temperature, pressure, fill level, flow rate, density, viscosity, pH value, redox potential, electrical conductivity, moisture, concentration of dissolved gases, sludge level, turbidity, global parameters, such as TOC, or the composition of multi component media. Furthermore, a field device, within the scope of the invention, can comprise an actuator, for example, a pump, a valve, a stirrer or a temperature control device, for example, a refrigeration unit or a heater. Field devices usually include an operating circuit for operating the field device, especially for providing measurement signals to a control system or for receiving actuating signals from the control system and for controlling the actuators according to the actuating signals.

BRIEF DESCRIPTION OF THE DRAWINGS

The invention will now be explained in greater detail based on the example of an embodiment shown in the drawing. The figures of the drawing show as follows.

DETAILED DESCRIPTION

Figure 1:
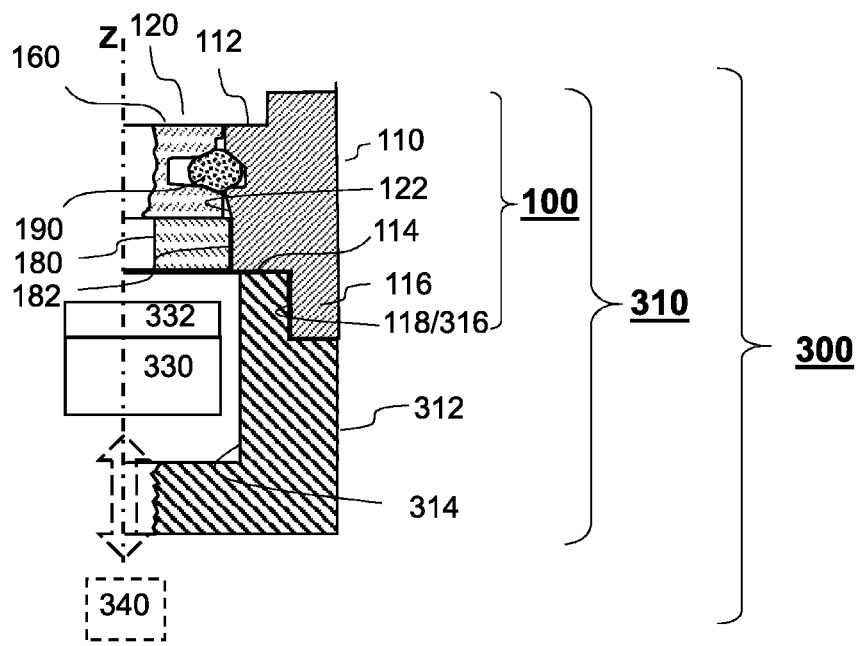
FIG. 1 shows a schematic longitudinal section of an example of an embodiment of a field device of the present disclosure.

The example of an embodiment of a field device 300 of the invention illustrated in FIG. 1 includes a field device housing 310 having an at least sectionally cylindrical housing body 312 and an assembly of the invention 100, which forms a housing lid. Embodied in the housing 300 is a chamber 314, in which an operating circuit 330 for operating the field device 300 is arranged. Field device 300 includes, additionally, a sensor module 340, which is mechanically connected with the housing 310 and especially carries the latter. Sensor module 340 can be, for example, a flow measuring transducer for registering a volume flow rate or mass flow rate. Sensor module 340 provides measured variable dependent, primary signals, which are conditioned by the operating circuit 330 for forwarding to a control system, or for display in a display 332. Details concerning this are known and do not need to be explained here.

Assembly 100 serving as housing lid includes an annular body 110 having a panel seat 120, into which a panel 160 is set and retained with an elastomer ring 190. The panel seat 120 extends as a circular opening between a first end face and a second end face of the annular body 110, wherein a lateral surface 122 bounding the panel seat has a contour, with which the elastomer ring 190 is retained and which is explained in greater detail below in connection with FIG. 2. Annular body 110 includes, additionally, a sleeve-like projection 116, on whose inner lateral surface a screw thread 118 is embodied, which engages in a complementary outer screw thread 316 of the housing body 312, in order to close the chamber 314. The circular panel 160 includes optionally on its chamber 314 near face a coaxial, circularly shaped projection 180 having a height of 10 mm on its outer lateral surface, wherein between the latter and an opposite lateral surface of the annular body 110 an annular gap 182 remains, which satisfies the requirements of a flame penetration barrier, especially thus, has a gap width of no more than 0.15 mm. In the case of corresponding dimensioning of the material thickness of the housing body 312, the annular body 110, the circular panel 160 and the elastomer ring 190, the field device 300 satisfies therewith the requirements of ignition protection type, "pressure resistant encapsulation", i.e. "Ex-d".

Figure 2:
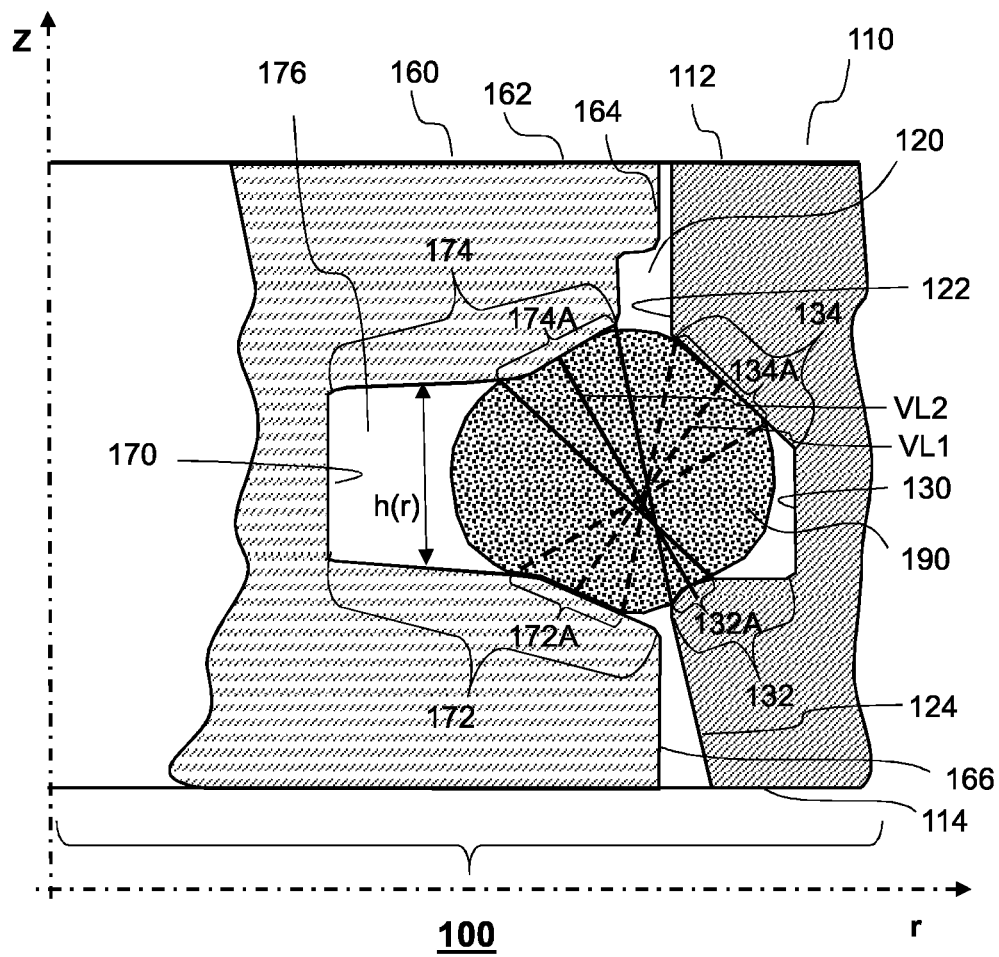
FIG. 2 shows a detail longitudinal section of components of the example of an embodiment of an assembly of the present disclosure.

Details of the assembly 100 of the invention, which in such case forms a housing lid, will now be explained based on FIG. 2. FIG. 2 shows a longitudinal section containing the Z axis, thus, the symmetry axis of the rotational symmetry of the assembly. Assembly 100 includes an essentially rotationally symmetric, annular body 110 having a first end face 112 and a second end face 114 spaced from the first end face 112. Extending between the first end face 112 and the second end face 114 is a traversing, circularly round opening, which forms a panel seat 120. The panel seat is bounded by a lateral surface 122, into which an outer ring groove 130 extends radially outwardly. The outer ring groove 130 is bounded in a first axial direction by a first outer shoulder 132 and in a second axial direction by a second outer shoulder 134. In the first axial direction there joins with the first outer shoulder 132 a first guide surface 124, which is embodied truncated cone like and is inclined from the Z axis at, for instance, 30°. The first outer shoulder 132 is, apart from a rounded off, convex chamfer in an inner end section, essentially planar. The second outer shoulder 134 is, in contrast, inclined, for instance, 40° to 50°, relative to a plane Z=const.

Introduced into the panel seat 120 is a circular panel 160, which has a first end face 162, which essentially axially aligns with the first end face 112 of the annular body 110. Additionally, the end face 162 has a radial projection 164 from the volume of the circular panel 160, in order to limit an annular gap between the circular panel 160 and the panel seat to no more than 0.15 mm. Extending radially inwards from a lateral surface 166 of the circular panel 160 into the circular panel 160 is an inner ring groove 170, which essentially aligns with the outer ring groove 130 in the axial direction. The inner ring groove 170 is bounded in the first axial direction by a first inner shoulder 172 and in the second axial direction by a second inner shoulder 174. The two inner shoulders 172, 174 have a convex shape in the cross-sectional view of FIG. 2, wherein the axial separation between the two inner shoulders 172, 174 defines a height h of the groove 170 increasing with increasing radius and a peripheral space 176 in the groove bounded by an elastomer ring 190. Elastomer ring 190 is clamped between the two outer shoulders 132, 134 and the two inner shoulders 172, 174. This retains the circular panel 160 in the panel seat 120. The radial projection 164 serves, additionally, as protection against press out of the circular panel 160 from the panel seat, for when the radial projection 164 through shifting of the circular panel 160 lies against the elastomer ring 190, further movement is stopped up to destruction of the elastomer ring 190.

The holding of the circular panel tight is favored by the following geometric aspects of the assembly:

If, in the longitudinal section of FIG. 2, a radially outermost bearing point of the elastomer ring 190 on the first inner shoulder 172 is connected with a radially innermost bearing point of the elastomer ring 190 on the second outer shoulder 134 and if a radially innermost bearing point of the elastomer ring 190 on the first inner shoulder 172 is connected with a radially outermost bearing point of the elastomer ring 190 on the second outer shoulder 134, then the two dashed lines result, wherein an angle bisector, which passes through their intersection and which extends between the first inner shoulder 172 and the second outer shoulder 134, defines a first connecting line VL1 between center points of the support surfaces 172A, 134A of the elastomer ring 190 on the first inner shoulder 172 and on the second outer shoulder 134.

If, correspondingly in the longitudinal section of FIG. 2, if a radially outermost bearing point of the elastomer ring 190 on the second inner shoulder 174 is connected with a radially innermost bearing point of the elastomer ring 190 on the first outer shoulder 132 and if a radially innermost bearing point of the elastomer ring 190 on the second inner shoulder 174 is connected with a radially outermost bearing point of the elastomer ring 190 on the first outer shoulder 132, then the two solid lines result, wherein an angle bisector, which passes through their intersection and which extends between the second inner shoulder 174 and the first outer shoulder, defines a second connecting line VL2 between center points of the support surfaces 174A, 132A of the elastomer ring 190 on the second inner shoulder 174 and on the second outer shoulder 132.

The two connection lines VL1, VL2, extend comparatively steeply for a radial seal. Thus, the first connecting line is inclined, for instance, 35° from the rotational axis Z, and the second connecting line is inclined, for instance, 29° from the rotational axis. In this way, the axial components of the connection lines amount, in each case, to more than 80% of their lengths. The lengths of the axial components are an indicator for the effectiveness of the elastomer ring 190 in resisting an axial shifting of the circular panel 160. A value of 80% is very good.

For assembling the assembly 100, an elastomer ring 190 is pushed over the lateral surface 166 of the circular panel 160, such that the elastomer ring lies against the two inner shoulders 172, 174. Then, the circular panel, with the end face 162 preceding, is plugged from the second end face 114 of the annular body into the panel seat 120. In such case, the elastomer ring 190 slides on the guide surface 124 and is pressed through the latter radially inwards into the relief space 176 of the inner ring groove 170, whereby the elastomer ring 190 is compressed in the axial direction between the inner shoulders, this resulting in considerable axial stresses. As soon as the periphery of the elastomer ring 190 has passed the end of the guide surface, the axial stresses in the elastomer ring 190 begin to decay, in that the elastomer ring 190 then expands into the available free volume of the outer ring groove 130, such that the elastomer ring reaches its final position, which can, in given cases, be optimized by small axial relative movements between annular body 110 and circular panel 160.

The invention claimed is:

1. A field device, comprising:
   a housing having a housing body and a housing lid, the housing lid including:
      an assembly, including:
         a circular panel;
         an annular body; and
         an elastomer ring;
         wherein the annular body has a panel seat surrounded by a lateral surface, wherein the lateral surface has a ring shaped, surrounding, outer groove bounded in a first axial direction by a first outer shoulder and bounded in an opposing, second axial direction by a second outer shoulder,
         wherein a guide surface adjoins the first outer shoulder in the first axial direction and the guide surface has a radius increasing monotonically with separation from the first shoulder, wherein $dr/dz<2/3$, wherein r is a radius and z is an axial coordinate of the guide surface in cylindrical coordinates,
         wherein the circular panel has an outer lateral surface having a peripheral inner groove extending radially inwards, which is bounded in the first axial direction by a first inner shoulder and which is bounded in the second axial direction by a second inner shoulder,
         wherein the two inner shoulders have a convex contour in an axial longitudinal section in which the rotational axis of the circular panel extends, and
         wherein the elastomer ring is clamped between both inner shoulders and both outer shoulders whereby a shifting of the circular panel out of the annular body is prevented up to a limit loading,
      wherein the annular body has further a cylindrical wall section; and
   an operating circuit arranged in the housing,
   wherein a screw thread of the housing lid is screwed onto a complementary screw thread of the housing body to enclose the operating circuit.

2. The field device as claimed in claim 1, wherein the field device satisfies ignition protection type, Ex-d.

* * * * *